United States Patent Office 3,370,953
Patented Feb. 27, 1968

3,370,953
METHOD OF PRODUCING A DEODORIZING FEED
Noashi Nakano, 165 1-chome, Saginomiya,
Nakano-ku, Tokyo, Japan
No Drawing. Filed Aug. 30, 1963, Ser. No. 305,847
Claims priority, application Japan, Sept. 1, 1962,
37/37,210
2 Claims. (Cl. 99—2)

The present invention relates to a method of producing a deodorizing feed for livestock and poultry in general, and to a method of producing a deodorizing feed for livestock and poultry wherein the deodorizing feed is produced by adding a humic-acid or a salt group thereof, which are mixed uniformly together.

The livestock and poultry herein includes dogs, cats, pigs, cows, horses, hens, cocks, ducks, etc. Corn, wheat-bran, bean-refuse, linseed sediment, vegetable fat and oil grain, rice-grain, wheat, seaweed, fish-meal, calcium-carbonate, sea-shell, vitamin, antibiotic substances, etc., or any suitable combination thereof have been used as their feed. However, to date no method is known for eliminating the excremental and offensive odor caused by such feeds.

It is one object of the present invention to provide a method which eliminates offensive odors, and promotes the growth of the livestock and poultry.

The present invention was developed to eliminate the offensive odor from the excrement of livestock and poultry, but has also been found to develop the growth of livestock and poultry.

It has been also found that the incidence of crossing and breeding of livestock and poultry increased considerably, and that the livestock and poultry developed beautifully. Further the crossing time of the livestock decreased and the breeding capacity of the poultry substantially increased.

Further, all the livestock and poultry treated with the present method developed attractive hairs and feathers.

Consequently, the method of the present invention may be used for feeding mink or any other livestock and poultry to develop attractive hairs and feathers.

With these and other objects in view which will become apparent in the following detailed description, the present invention will be clearly understood in connection with the following description and examples.

The humic-acid applied in accordance with the present invention consists of $C_5H_{4-47}O_{17}$, that is to say, the component is chemically composed of 10–15 times of C basing with one COOH and 15–17 times of C basing with one OH as mentioned.

These humic acids or salts thereof are, usually, obtained from such substances as peat, lignite, brown-coal etc., through a proper chemical treatment.

The addition of the humic acid to substances having an offensive odor offers a chemical reaction where COOH—OH, a part of the humic acid, reacts with the basic substances such as ammonia, volatile-lower-amine etc., and a water-insoluble-acid-humic-salt, is produced which is melted with an odorized solution.

Consequently, the reaction thereof progresses rapidly due to the chemical reaction such that the melted molecules in the water solution may react with each other.

A feed containing a small amount of humic-acid or salt group in accordance with the present invention has been fed to livestock and poultry and the excremental substances of the livestock and poultry were substantially deodorized, as will be shown by example hereinafter.

The offensive odor of these excrements is primarily caused by such substances as ammonia from decomposed protein and volative-lower amine. These substances react with respective radicals of —COOH and —OH which belong to the humic-acid so that a water-soluble-acid-humic-salt is produced. The produced water-soluble-acid-humic-salt retains a considerable amount of —COOH and —OH, respectively, which will, in turn, react with the basic odor producing substances generated from the decomposed protein therefore eliminating the offensive odor of the excremental substance and also effectively promoting the growth of the livestock and poultry.

In accordance with tests performed by the inventor, the following information has been obtained:

A feed containing 0.4 gram of humic-acid per 100 grams was given to healthy mink continuously for 33 days. Their crossing-times increased from 15 to 22 and their drinking water increased by as much as 20%. In addition, both females and males developed attractive complexion and a remarkable increase in their hairs.

Hens were treated by giving them a feed containing 0.1% of the humic-acid. Their quantity of laying-eggs increased from 186 to 322, and a fishy odor was entirely eliminated from the taste of these eggs.

Several further examples will now be presented.

*Example 1*

1700 grams, average weight, 115 white leghorns were divided into 20 sections, A through T, of which the respective sections measured about 3′ by 6′ square and all sections were occupied with 5 or 6 leghorns.

Throughout a two-months experiment, the following results occurred as indicated in the following tables.

Humic-acid in accordance with the present invention was given by adding it to the usual feed, in the following amounts:

Groups A to E were fed without the humic-acid.
Groups B to J, 0.3% humic-acid three times a day.
For groups K to O, 0.2% humic-acid was added to the feed and provided three times a day.
For groups P to T, 0.1% humic-acid was added to the feed and provided three times a day.

TABLE NO. 1.—FIRST 10 DAYS

| Section | Average weight (g.) | Number of hens and cocks | Volume of the feed eaten per animal (g.) | Quantity of humic-acid added (g.) | Deodorizing effect | Thickness of the excrements |
|---|---|---|---|---|---|---|
| A–E | 1,700–1,900 | 27 | 100 | None | Bad odor | Liquid. |
| F–J | 1,700–1,900 | 30 | 100 | 0.3 | Substantially deodorized. | Substantially thick. |
| K–O | 1,700–1,900 | 29 | 100 | 0.2 | Slight odor | Normal. |
| P–T | 1,700–1,900 | 29 | 100 | 0.1 | Medium odor | Do. |

TABLE NO. 2.—SECOND 10 DAYS

| Section | Average weight (g.) | Number of hens and cocks | Volume of the feed eaten per animal (g.) | Quantity of humic-acid added (g.) | Deodorizing effect | Thickness of the excrements |
|---|---|---|---|---|---|---|
| A–E | 1,700–1,900 | 27 | 100 | None | Bad odor | Liquid. |
| F–J | 1,700–1,900 | 30 | 100 | 0.3 | Substantially deodorized. | Substantially thick. |
| K–O | 1,700–1,900 | 29 | 100 | 0.2 | Slight odor | Normal. |
| P–T | 1,700–1,900 | 29 | 100 | 0.1 | Medium odor | Do. |

TABLE NO. 3.—THIRD 10 DAYS

| Section | Average weight (g.) | Number of hens and cocks | Volume of the feed eaten per animal (g.) | Quantity of humic-acid added (g.) | Deodorizing effect | Thickness of the excrements |
|---|---|---|---|---|---|---|
| A–E | 1,700–1,900 | 27 | 100 | None | Bad odor | Very soft. |
| F–J | 1,700–1,900 | 30 | 100 | 0.3 | No smell | Substantially thick. |
| K–O | 1,700–1,900 | 29 | 100 | 0.2 | Medium odor | Normal. |
| P–T | 1,700–1,900 | 29 | 100 | 0.1 | ....do.... | Do. |

TABLE NO. 4.—FOURTH 30 DAYS

| Section | Average weight (g.) | Number of hens and cocks | Volume of the feed eaten per animal (g.) | Quantity of humic-acid added (g.) | Deodorizing effect | Thickness of the excrements |
|---|---|---|---|---|---|---|
| A–E | 1,700–1,900 | 27 | 100 | None | Bad odor | Soft. |
| F–J | 1,700–1,900 | 30 | 100 | 8.0 | No smell | Thick. |
| K–O | 1,700–1,900 | 29 | 100 | 5.0 | ....do.... | Do. |
| P–T | 1,700–1,900 | 29 | 100 | 3.0 | ....do.... | Do. |

*Example 2*

A 15 kg. cross-bred male dog, was fed 0.45 gr. of humic-acid each meal and taken twice a day.

A deodorizing effect occurred on the third day, and on the fourth day, the excrement developed into an odorless condition, and thereafter the odorless condition was continuously maintained, although the addition of the humic-acid to the meal was decreased to 0.3 gr.

Accordingly with the present invention the addition of the humic-acid or the salt thereof to the feed of livestock and poultry is very effective to deodorize the excrements, to increase the incidence of crossing and breeding, and to promote and beautify the hairs and feathers thereof attractively.

While I have disclosed several embodiments of the present invention, it is to be understood that these embodiments are given by example only and not in a limiting sense, the scope of the present invention being determined by the objects and the claims.

What I claim is:

1. A method of feeding livestock and poultry comprising the steps
   selecting a livestock and poultry feed,
   adding thereto at least 0.1% of a compound selected from the group consisting of humic-acid and humic acid salt, to form a mixture, and
   feeding said mixture to said livestock and poultry.

2. The method, as set forth in claim 1, wherein said compound is $C_5H_{4-47}O_{17}$.

References Cited

UNITED STATES PATENTS

| 2,926,085 | 2/1960 | Geerlings | 99—2 |
| 2,992,093 | 7/1961 | Burdick | 260—515 |
| 3,124,460 | 3/1964 | Erwin | 99—2 X |

FOREIGN PATENTS

| 167,494 | 8/1921 | Great Britain. |

OTHER REFERENCES

Chemical Abstracts (I), vol. 53, No. 14, p. 13633(b), July 25, 1959.

Chemical Abstracts (II), vol. 53, No. 5, p. 5562(d), Mar. 10, 1959.

Webster's Third New International Dictionary, p. 1101, Merriam Co., Springfield, Mass. (1961).

A. LOUIS MONACELL, *Primary Examiner.*

D. DONOVAN, *Examiner.*

J. M. HUNTER, *Assistant Examiner.*